United States Patent
Wang et al.

(10) Patent No.: US 12,184,719 B2
(45) Date of Patent: Dec. 31, 2024

(54) CLOUD-NETWORK INTEGRATION ORIENTED MULTI-ACCESS EDGE COMPUTING ARCHITECTURE

(71) Applicant: SHENZHEN UNIVERSITY, Shenzhen (CN)

(72) Inventors: Lu Wang, Shenzhen (CN); Jianhao Zhang, Shenzhen (CN); Kaishun Wu, Shenzhen (CN); Ting Wang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 18/476,269

(22) Filed: Sep. 27, 2023

(65) Prior Publication Data
US 2024/0031427 A1    Jan. 25, 2024

Related U.S. Application Data

(63) Continuation of application No. PCT/CN2021/087265, filed on Apr. 14, 2021.

(51) Int. Cl.
*H04L 67/1001* (2022.01)
*H04W 28/02* (2009.01)
*H04W 72/542* (2023.01)

(52) U.S. Cl.
CPC ....... *H04L 67/10015* (2022.05); *H04W 28/02* (2013.01); *H04W 72/542* (2023.01)

(58) Field of Classification Search
None
See application file for complete search history.

(56) References Cited

U.S. PATENT DOCUMENTS

| | | |
|---|---|---|
| 2020/0280827 A1 | 9/2020 | Fechtel et al. |
| 2022/0014963 A1* | 1/2022 | Yeh .......................... G06N 7/01 |
| 2022/0248375 A1* | 8/2022 | Baek ................. H04W 72/0453 |

OTHER PUBLICATIONS

Lu Wang, FC-MAC: Fine-grained Cognitive MAC for Wireless Video Streaming, Dec. 2014, IEEE (Year: 2014).*
Zhang Haibo et al, "V2X Offloading and Resource Allocation in SDNAssisted MEC-Based Vehicular Networks", China Communications, vol. 17, No. 5, May 29, 2020, section 1.
(Continued)

*Primary Examiner* — Fadi Haj Said (57) ABSTRACT

The present application discloses a cloud-network integration (CNI) oriented multi-access edge computing (MEC) architecture. An access network (AN) side of the architecture is provided with a plurality of edge computing nodes, a physical channel of the AN side is split into a plurality of subchannels with each of the subchannels supporting a media access control (MAC) access mode, and a software defined network (SDN) controller is arranged in the architecture and is configured to allocate resources of the subchannels at a physical layer and protocols at an MAC layer and control offloading at the edge computing nodes or a cloud center by a terminal user. The present application can carry out fine-grained control and cooperative management on network resources and computing resources, and achieve more effective computation offloading and service enhancement.

9 Claims, 7 Drawing Sheets

(56) References Cited

OTHER PUBLICATIONS

Prateek Shantharama et al., "LayBack: SDN Management of Multi-access Edge Computing (MEC) for Network Access Services and Radio Resource Sharing", IEEE Access, vol. 6, Oct. 8, 2018, pp. 57545-57561.

Huang Chung-Ming et al., "V2V Data Offloading for Cellular Network based on the Software Defined Network (SDN) inside Mobile Edge Computing (MEC) Architecture", IEEE Access, vol. 6, Mar. 29, 2018, pp. 17741-17755.

Zhang Haibo et al,"Task offloading and resource allocation in vehicle heterogeneous networks with MEC", Chinese Journal on Internet of Things, vol. 2, No. 3 Sep. 30, 2018, pp. 36-43.

\* cited by examiner

CLOUD-NETWORK INTEGRATION ORIENTED MULTI-ACCESS EDGE COMPUTING ARCHITECTURE

CROSS-REFERENCE TO RELATED APPLICATIONS

This application is a continuation of International Patent Application No. PCT/CN2021/087265, filed on Apr. 14, 2021. The content of the aforementioned applications, including any intervening amendments thereto, are incorporated herein by reference.

TECHNICAL FIELD

The present application relates to the technical field of computer networks, in particular to a cloud-network integration (CNI) oriented multi-access edge computing (MEC) architecture.

BACKGROUND OF THE APPLICATION

In recent years, tablet computers, smart phones, large-scale sensors, and a wide variety of heterogeneous Internet of Things devices have become more and more popular, hence being major computing resources in daily life. On one conservative estimate, over 50 billion terminal devices will be interconnected by 2022. With the explosive growth of terminal devices, applications (such as interactive games, natural language processing, facial recognition, augmented reality) designed for terminal devices have been constantly emerging. Such types of applications often require a large quantity of resources, including intensive computing resources and high-speed transmission resources. As novel interactive mobile applications become increasingly abundant and terminal devices get more and more powerful, mobile computing is undergoing considerable transformation.

Recent research advances have witnessed the changes in the mode of mobile computing. Under the drive of mass data generated continuously by terminal devices, centralized mobile cloud computing is now migrating to mobile edge computing. The computation, storage and network resources are all integrated at the base station (BS) side. A large quantity of free computing resources and memory space at the edge of network can be fully utilized to accomplish compute intensive and latency critical computing tasks. As various computing and storage resources closer to terminal users, mobile edge computing is expected to provide services with ultra-low latency and ultra-low network congestion for resource-intensive applications.

The explosive growth of terminal devices makes wireless connectivity one of the key technologies for exploiting the potential of mobile edge computing. Accordingly, the application scope of mobile edge computing has been extended into radio access network (RAN), so as to provide the capability of edge computing. This is also called multi-access edge computing (MEC). In a multi-access computing architecture, the edge computing resources may be deployed in an LTE base station (eNodeB), a 3G radio network controller (RNC), or a multi-antenna aggregation base station. As one of typical technologies of CNI, MEC deeply blends theories and technologies of two subjects of mobile computing and wireless communication, and has thus been widely recognized by researchers in academic circles and industrial circles. It is foreseeable that combining the novel wireless network technology with the service-oriented edge-cloud architecture can significantly reduce network congestion and user latency, improve quality of service (QoS) and quality of experience (QoE) of users, and provide better services for terminal applications, content providers, and third-party operators.

Despite researchers' continual trials and extensive efforts in MEC, MEC is still faced with many challenges due to limitations in physical hardware of terminal devices and the connection capability of wireless channels. For example, existing solutions typically only consider coarse-grained resource allocation policies for resources including transmission, computation, and storage resources. However, these resource allocation policies lack fine-grained control over all possible resources, making itself a major obstacle to implementing latency-sensitive services.

SUMMARY

An objective of the present application is to overcome defects of the prior art and provide a CNI oriented MEC architecture, which is a novel technical solution of a software-defined fine-grained MEC architecture and can flexibly perform fine-grained allocation on resources.

The technical solution of the present application is to provide a CNI oriented MEC architecture. An access network (AN) side of the architecture is provided with a plurality of edge computing nodes, a physical channel of the AN side is split into a plurality of subchannels with each of the subchannels supporting a media access control (MAC) access mode, and a software defined network (SDN) controller is arranged in the architecture and is configured to allocate resources of the subchannels at a physical layer and protocols at an MAC layer and control offloading at the edge computing nodes or a cloud center by a terminal user.

Compared with the prior art, the present application has an advantage that a software defined fine-grained MEC architecture is provided, which can perform fine-grained control and cooperative management on network resources and computing resources. In addition, a two-stage resource allocation strategy based on deep reinforcement learning Q-learning is designed, so that more effective computation offloading and service enhancement are provided.

Other features of the present application and advantages thereof will become apparent from the following detailed description of exemplary embodiments of the present application with reference to the accompanying drawings.

BRIEF DESCRIPTION OF THE DRAWINGS

The accompanying drawings, which are incorporated in and constitute a part of the specification, illustrate the embodiments of the present application and, together with the description, serve to explain the principles of the present application.

DETAILED DESCRIPTION

Various exemplary embodiments of the present application will now be described in detail with reference to the accompanying drawings. It should be noted that the relative arrangement of the components and steps, the numerical expressions and numerical values set forth in the embodiments do not limit the scope of the present application unless it is specifically stated otherwise.

The following description of at least one exemplary embodiment is merely illustrative in nature and is in no way intended to limit the present application, application thereof or use thereof.

Techniques, methods, and devices known to those of ordinary skills in the relevant art may not be discussed in detail, but the techniques, methods, and devices should be considered as a part of the specification where appropriate.

In all examples shown and discussed herein, any specific value should be construed as exemplary only rather than limiting. Thus, other examples of the exemplary embodiments may have different values.

It should be noted that: similar reference numbers and letters refer to similar items in the following figures, and thus, once an item is defined in one figure, it does not need to be further discussed in subsequent figures.

The present application provides a software defined fine-grained MEC architecture. The architecture mainly involves three aspects: a physical layer/MAC layer design, which adopts a CNI oriented fine-grained physical layer/MAC layer slicing technology, and starting from an underlying network, realizes fine-grained blending and concurrent transmission of MAC for an access network through physical layer/MAC layer slicing; a software defined fine-grained MEC architecture, which is adopted to achieve cooperative optimization on the resources of multi-access mobile edge computing nodes, where with edge computing, cooperative optimization can be better realized using the characteristics of an access network and the resources of the MEC nodes; and an adaptive resource allocation algorithm, which is a fine-grained adaptive resource allocation learning algorithm designed based on Q-Learning and oriented towards CNI.

Specific embodiments of the above three aspects are described in detail below.

1) Physical Layer/MAC Layer Design

Figure 1:
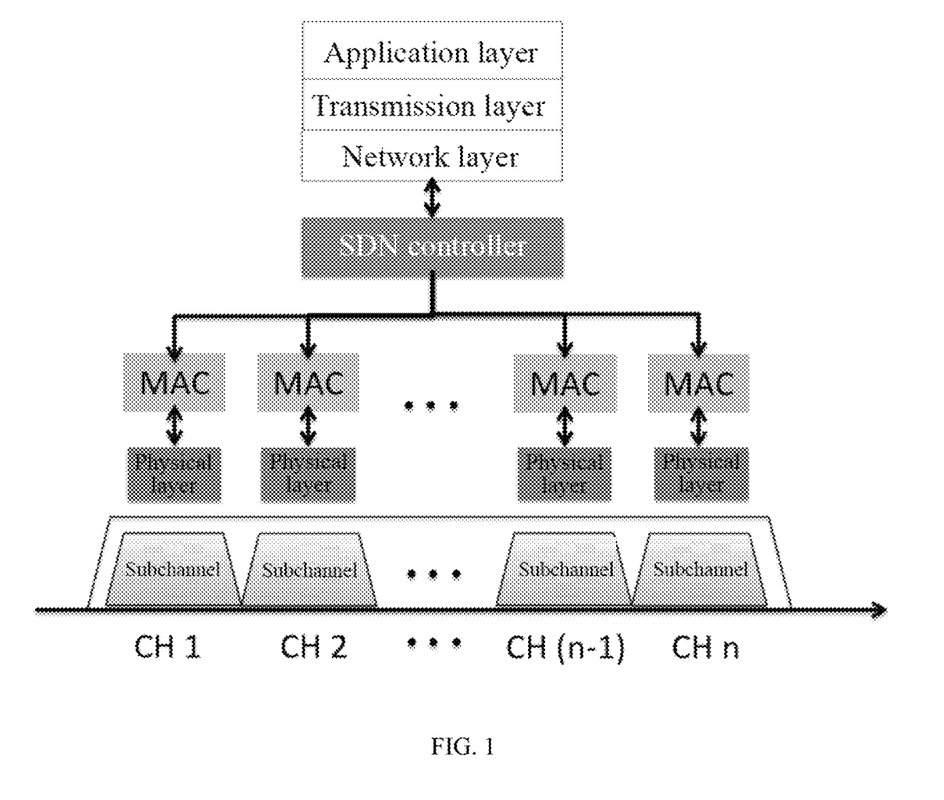
FIG. 1 is a schematic diagram of a CNI oriented edge computing protocol stack according to an embodiment of the present application.

Starting from the underlying layer of the access network, a slicing design based on a physical layer and an MAC layer is provided. Referring to FIG. 1, an original physical channel is split into a plurality of fine-grained units (e.g., subchannels composed of a plurality of subcarriers), with each of the subchannels being capable of supporting an MAC access mode. In this way, different terminal devices can access the same channel through different MAC protocols according to their channel quality and the transmission requirements, so that channel resources are utilized to the maximum extent.

Specifically, the physical layer/MAC layer slicing is built on orthogonal frequency-division multiplexing (OFDM) technique. The subcarriers of the physical layer are decoupled, so that fine-grained MAC access is realized. The physical layer/MAC layer slicing provides a flexible, adaptive transmission commitment for a terminal user to access a network. The concurrent transmission of multiple MAC accesses on a frequency domain can better meet dynamic and various transmission requirements of a terminal user. Under this background, the protocol stack is further provided with a software defined network (SDN) controller, which runs above the physical layer/MAC layer slicing, and is responsible for the allocation of the subchannels at the physical layer and protocols at the MAC layer. By timely adjusting the subchannel resources of the physical layer and an access protocol of the MAC layer, the SDN controller aims to carry out cooperative optimization on the resources of the physical layer and the MAC layer by using the diversity of underlying channels, so that the resource utilization rate is improved to the maximum extent.

In addition, since the conventional contention strategy for subchannel resources significantly adds up to the transmission cost, in a preferred embodiment, a contention strategy for frequency domains is further designed in the present application. In the contention strategy for frequency domains, terminal users can simultaneously request for resources by using different frequency domains. Therefore, compared with traditional time domain contention, the contention strategy for frequency domains can fully utilize the frequency domain resources, which avoids the transmission conflict of the time domain contention, and significantly reduces the expenses resulting from contention.

Figure 2:
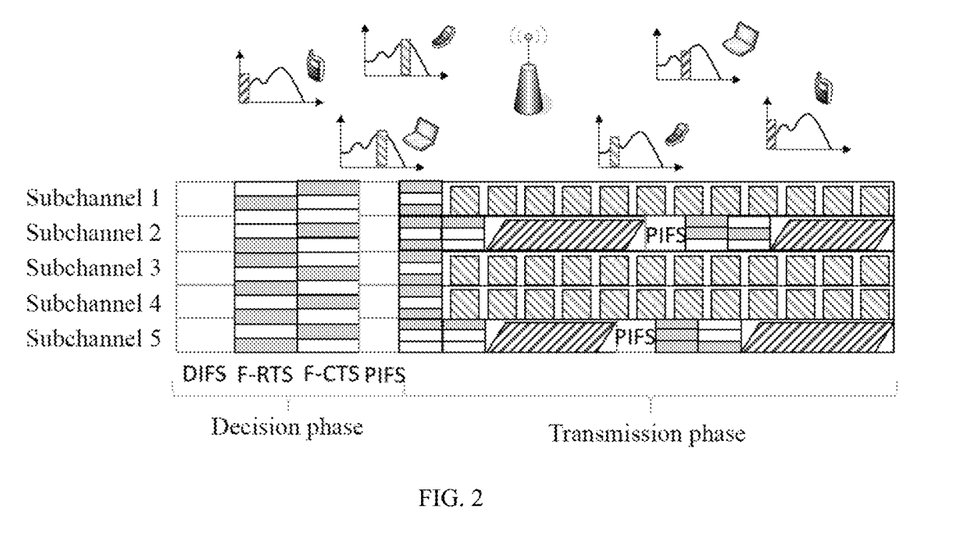
FIG. 2 is a schematic diagram of physical layer/MAC layer slicing according to an embodiment of the present application.

For example, in order to apply to a fine-grained edge computing architecture, a two-stage F-RTS/F-CTS structure (F-RTS indicates that a frequency domain is ready to transmit, and C-RTS indicates that transmission of a frequency domain is confirmed) is designed, as an example of a contention strategy for frequency domains given in FIG. 2. The entire channel is divided into 5 subchannels. After the network is initialized, the terminal user first waits for a DCF distributed inter-frame spacing (DIFS) to complete the synchronization. Subsequently, during the polling period, the terminal user makes a request for transmission/computation by a contention strategy for frequency domains. After acquiring the requirements of all users, the SDN controller runs a resource allocation strategy to allocate all possible resources (such as transmission resources, computing resources, and storage resources) according to the channel quality and transmission/computation requirements of the terminal user, and feeds back an allocation result in the F-CTS. After waiting for the PCF interframe space (PIFS), the terminal user may access the channel resources allocated to him/her according to notification.

Specifically, the two-stage F-RTS/F-CTS structure implements two-stage contention polling, namely a contention/notification polling phase and a transmission polling phase. The contention/polling phase of the first stage is handled by the F-RTS/F-CTS for channel and computing resource allocation. In the transmission polling phase of the second stage, F-RTS/F-CTS is used for another purpose. If a contention type MAC protocol such as carrier sense multiple access (CSMA), i.e., subchannels 2 and 5 in FIG. 2, are allocated to the terminal user, then the F-RTS/F-CTS of these two subchannels are configured to organize the terminal user's access to the access network. If a reservation type MAC protocol, e.g., subchannels 1, 3, 4 in FIG. 2 are allocated to the terminal user, then the F-RTS/F-CTS of the three subchannels are configured to arrange a transmission schedule. Thus, the F-RTS/F-CTS has different frame formats in the two layers. For example, in the first stage, F-RTS/F-CTS is used for contention of resources, and thus in the frequency domain, F-RTS/CTS includes two parts: one part is used as an identifier, and the other part is used as a contention/ notification frequency band. The identifier part is configured to indicate whether the current frame is F-RTS or F-CTS. This identifier part is placed at the beginning of the frame. Taking a 64-point FFT as an example, in general, 16 subcarriers are desirable to ensure the anti-jamming capability of BAM. Then, in the contention/notification frequency band, in order to ensure the anti-jamming capability, a request for transmission is made with every 4 subcarriers as a basic unit, and a request for computing resources is made with every 12 subcarriers as a basic unit. Accordingly, in the notification phase, the subcarriers are also divided into two parts, one part for confirming the allocation of MAC protocols, and the other part for confirming the allocation of the subchannels. In the second stage, the F-RTS/F-CTS is used for fine-grained access network resource access, and given the dynamic and diverse transmission requirements of the terminal device, the transmission of the second stage can be used for achieving concurrent transmission of different types of MAC protocols. The specific allocation of this part is also planned by the SDN controller. For example, regarding a reservation type MAC protocol such as time division multiple access (TDMA), transmission scheduling may be performed through the F-CTS. While regarding a contention type MAC protocol such as CSMA, fine-grained subchannel access contention may be performed using F-RTS/F-CTS. In CSMA contention of the second stage, a user can randomly select one subcarrier as its identifier and use the subcarrier to transmit a BAM symbol during F-RTS. If the terminal user's access is granted, the SDN controller then gives notification on the corresponding subcarrier during the F-CTS. In this way, fine-grained access network resource allocation can be realized, so that the spectral efficiency and the system efficiency of the access network are improved to the maximum extent.

2) Software Defined Fine-Grained MEC Architecture

Figure 3:
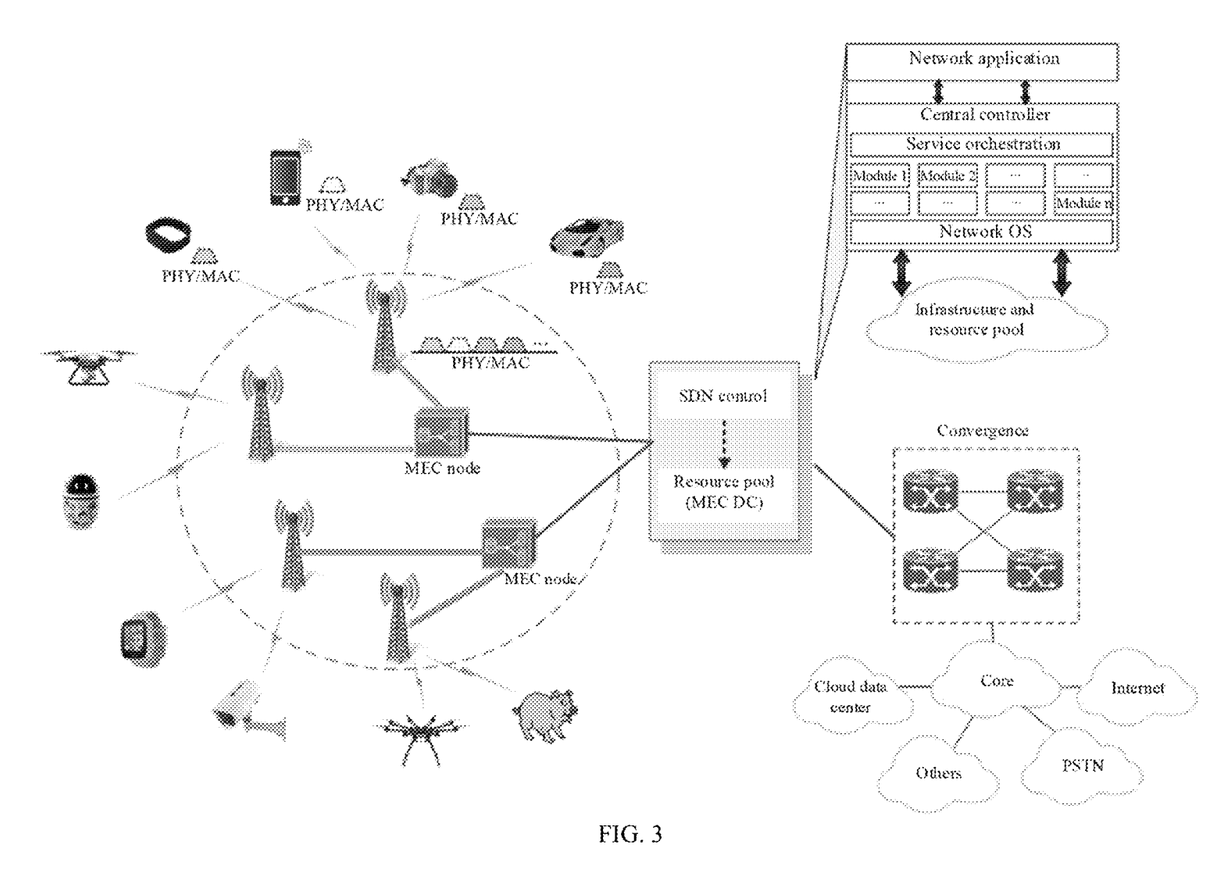
FIG. 3 is a schematic diagram of a CNI oriented fine-grained MEC architecture according to an embodiment of the present application.

The software defined fine-grained MEC architecture is as shown in FIG. 3, where MEC nodes (e.g., servers) with storage and computing resources are deployed in the access network to provide resilient network services such as computation offloading and service caching for a terminal user. These MEC nodes may be deployed in eNodeBs, BSs, macro stations, or small base stations. In addition, MEC nodes may also be deployed in residential areas and access through edge switches or integrated switches. In addition to the MEC nodes in the access network, MEC data centers (DCs) of appropriate sizes are deployed between the access network and the convergence network as needed. Typically, aggregation nodes of a convergence network, such as a public switched telephone network (PSTN) and a central or mobile telephone switching office (MTSO), are ideal sites for deploying MEC DCs, since all traffic passes through these nodes before accessing the Internet. Moreover, the MEC DC is also a software defined data center, where MEC nodes (i.e., resource pools including computing and storage capacities) are controlled by one or more SDN controllers as needed.

Figure 4:
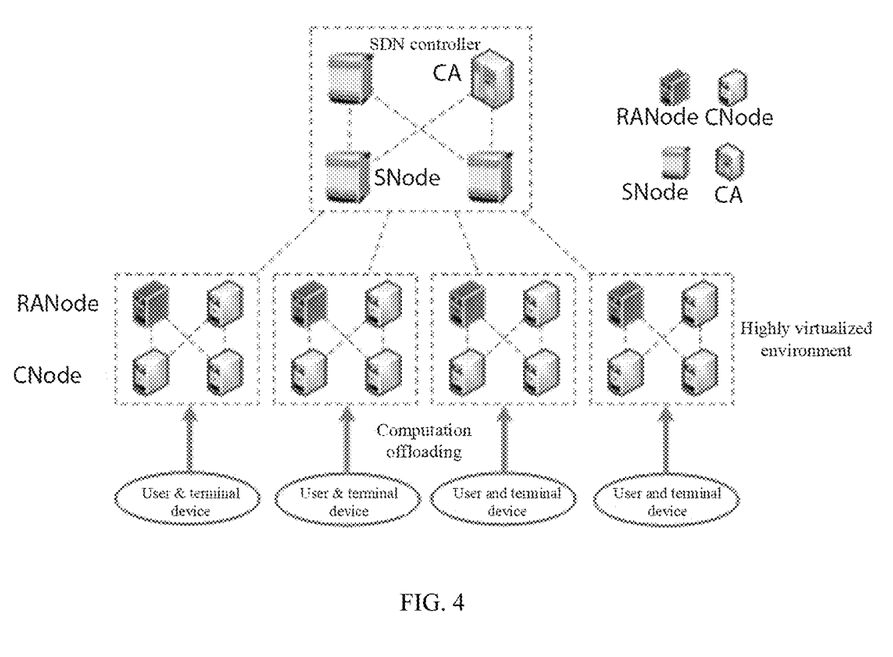
FIG. 4 is a schematic diagram of a distributed node architecture based on software-defined MEC according to an embodiment of the present application.

FIG. 4 shows a schematic diagram of a distributed node architecture based on software-defined MEC. The architecture includes multiple MEC nodes achieving different functions and roles, including, e.g., a common node (CNode), regional node (RANode), a super node (SNode), and a certificate authority (CA) node.

CNode: CNode is one of the most common MEC nodes, and is distributed throughout the access network. The CNode is configured to provide computation offloading services for the terminal user and providing storage resources for service caching of the remote Internet/cloud service. The CNodes are highly virtualized, and virtual machines (VM) may be remotely installed/migrated onto the CNodes under the control of the SNodes.

RANode: RANode indicates a regional MEC node positioned in the access network. The RANodes are selected by SNodes. The SNode determines an appropriate RANode from the CNodes within the scope of the access network. The RANodes are responsible for discovering resources, and managing/monitoring the states of all CNodes within its region. Despite the role of a regional proxy, the RANode itself is also a CNode, and can perform computation offloading.

SNode: SNode indicates a super intelligent node positioned in the MEC data center between the access network and the convergence network. Each SNode is responsible for managing a certain number of CNodes and RANodes allocated to the SNode by the SDN controller. The SNode is responsible for managing remote installation of a VM on the CNodes/RANodes, joining/exiting of nodes (seamless extension), node configuration, user management, etc. The SNode is controlled by an SDN controller and may communicate with other SNodes. The SNode may also cache Internet services and cloud services offloaded from a remote data center. Further, the SNode may offload some of the caching services to a CNode or an RANode that is closer to the terminal user, which greatly improves the efficiency of computation offloading.

CA node: the CA node is a node positioned in the MEC data center and is responsible for generating and managing certificates for users, providing functions of signing, authorization and certificates, and retaining information of all authorized users in a certificate repository.

3) Adaptive Resource Allocation Algorithm

Figure 5:
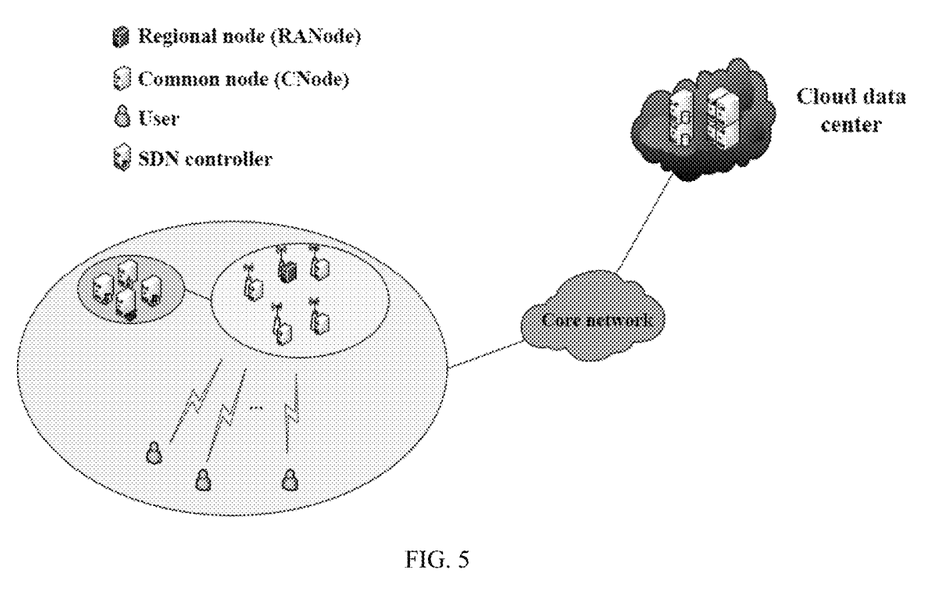
FIG. 5 is a schematic diagram of a CNI oriented resource allocation model according to an embodiment of the present application.

In an embodiment of the present application, an adaptive resource allocation strategy based on deep reinforcement learning is adopted. Specifically, for the adaptive resource allocation algorithm, a CNI oriented fine-grained edge architecture is abstracted into a system model shown in FIG. 5. The model is set to be a multi-level network consisting of m users $client_{\{1, 2, \ldots, m\}}$, n edge computing nodes $CNode_{\{1, 2, \ldots, n\}}$, an SDN controller, an SNode and a central cloud. Based on the system model, a resource allocation algorithm is modeled specifically according to the following procedure:

User task $ClientTask_i$, ($i \in \{1, 2, \ldots, m\}$): representing a task request submitted by user i. Where $ClientTask_i$ can be subdivided into $Task_i = \{Mem_i, f_i\}$, where $Mem_i$ indicates the memory size required by the task, representing the storage capacity required by the task. $f_i$ indicates a clock period required to process 1 bit of data, representing the computing power required by the task.

Service node resource: $ServerSource_j$, ($j \in \{1, 2, \ldots, n\}$), indicating the quantity of resources possessed by the service node j. can also be subdivided into: $ServerSource_j = \{Mem_j, f_j\}$.

MAC protocol: MACProtocol={TDMA, CSMA}.

Channel quality CSI: $CSI = \{CSI_{c1}, CSI_{c2}, \ldots, CSI_{cm}\}$.

The model shall meet the following constraint conditions, that is, the user task is smaller than the service node resource: $Task_i = \{Mem_i, f_i\} \leq \forall ServerSource_j = \{Mem_j, f_j\}$, ($i \in \{1, 2, \ldots, m\}, j \in \{1, 2, \ldots, n\}$)

In addition, the following relationship exists between the MAC protocol selected by the user and the channel quality CSI: MAC=$\lambda$*CSI. where $\lambda$ indicates the probability of selecting a certain MAC protocol.

For the given user task ClientTask$_i$ and channel quality CSI$_i$, the goal is to optimize network utility and computing utility of the entire system, which can be expressed as:

$$\text{Utility} = \max\Phi(ServerSource, ClientTask, MACProtocol, CSI) = \max\sum_{i=1}^{m}\Phi_{ServerSource_i}^{ClientTask_i}\Phi_{CSI_i}^{MAC\ Protocol_i}$$

In the description herein, a service node indicates a node for providing computation offloading services for the terminal user and providing storage resources for service caching of the remote Internet/cloud service, which may be, for example, a CNode.

Based on the above modeling, preferably, a collaborative learning optimization strategy integrating characteristics of the network and cloud is designed. Firstly, the distribution of transmission resources is subjected to fine-grained learning according to the characteristics of an access network of a terminal user, and then computation offloading is subjected to strategic learning based on the learning result of the transmission resources and in combination with the calculation performance of the edge computing node, so that the network and the computing resources are utilized to the maximum extent.

Specifically, the collaborative learning optimization strategy integrating characteristics of the network and cloud includes the following steps:

Step S110: According to the channel quality of the terminal user, a physical layer/MAC layer strategy of each user is subjected to adaptive learning.

The SNode first performs adaptive learning on the physical layer/MAC layer strategy of each user according to the channel quality $CSI_{\{1,\ 2\ \ldots,\ m\}}$ of the terminal user. Assuming that there are currently S subchannels channel$_{\{1,\ 2\ \ldots\ s\}}$ in total, a computing task that a user client$_i$ needs to offload may be represented as task$_i$={$s_i$, $g_i$}, i∈{1, 2, . . . , Q}, where Q indicates the total quantity of tasks that the user offloads, $s_i$ indicates an input size of task data, and $g_i$ indicates a size of requested server computing resources. The SNode needs to determine the MAC strategy MAC$_i$ to be used for the user client$_i$.

State: control possesses channel quality of all terminal users, and therefore, the overall system state represented by control can be expressed as:

State={Subch$_1$,Subch$_2$, . . . ,Subch$_n$,MAC$_i$}

Where subch indicates a channel resource, and MAC$_i$ indicates a subchannel MAC protocol allocated by an i-th user.

Action: the action is expressed as an MAC protocol selected for the user by control, that is, the set of actions can be expressed as:

{MAC$_1$,MAC$_2$,MAC$_n$}

Reward: the reward part is determined according to the state of environmental information before and after the action is performed.

For example, based on the environmental information of a latency indicator, there is an increase of −0.2 if State$_t$=100 s and State$_{t+1}$=120 s. Therefore, by the above computation method, an indicator increase ratio can be acquired, and the computation formula is as follows:

IncreaseRatio=|State$_t$−State$_{t+1}$|/State$_t$

In the above formula, the numerator portion takes the form of an absolute value because the effects of the indicator increase ratio vary depending on different forms of indicators. For a latency indicator, increasing the indicator value brings a negative yield, while for an indicator such as throughput, the growth of the indicator value brings a positive yield. Therefore, it is necessary to set a computation formula for an indicator increase ratio in accordance with a form of a specific indicator.

The indicator increase ratio can be acquired according to the above analysis. However, in order to prevent the phenomenon of over-fitting and perform rationality analysis on the Q-table update, the computation formula for the reward is set as follows:

$$\text{reward} = \begin{cases} 0, & \textit{IncreaseRatio} > 0 \wedge MAC \text{ no change} \\ \lambda * \textit{IncreaseRatio}, & \text{others} \end{cases}$$

For the above formula, after a dominant MAC protocol is acquired, the reward is set to 0 to prevent the Q-table value from being too large and Q_Learning from converging too fast. λ is an attenuation factor configured to prevent the situation that excessively large increase ratio leads to excessively large reward and excessively fast convergence.

The following describes an adaptive MAC allocation protocol based on Q-learning.

***************************************************
Algorithm 1. MAC protocol selection algorithm based on Q_Learning
Input: type of network indicator
Output: network performance indicator
(1) Initialize a Q table to an initial state
Repeat
(2) Determine the current network condition from the current state and the type of a network indicator
(3) Select an MAC protocol based on the current network condition using the Q-table or ε_ greedy strategy
(4) The user changes the MAC protocol and reports a new state
(5) Determining a new network condition from the new state and the type of network indicator
(6) Calculate action rewards by comparing the previous network condition with the later network condition
(7) Update the Q-table and the current state according to the acquired reward
(8) Record the network performance indicator of this time
End condition: a termination state or training number is reached
Return: network performance indicator
***************************************************

Step S120: SNode further performs strategy learning of computation offloading for the terminal user.

After determining the terminal user's physical layer/MAC layer strategy, the SNode further performs strategy learning of computation offloading for the terminal user. Assuming that the server Server source can be represented as source$_j$={$f_i$}, j∈{1, 2, . . . , n}, where $f_j$ indicates comprehensive evaluation of the server source. The resources allocated in terms of communication are described using an MAC protocol, that is, $c_k$={TDMA, CSMA}, k∈{1, . . . , n}.

State: control possesses information of all edge servers, and task information submitted by a user, and therefore, the overall system state represented by control can be expressed as:

State={EdgeServerSource$_1$,EdgeServerSource$_2$, . . . , EdgeServerSource$_n$,Task$_u$}

Where EdgeServerSource$_n$ indicates resources possessed by an n th edge server, and Task$_u$ indicates task request information of a u-th user.

Action: the action is expressed as selecting an offloading server for the user by control, that is, the set of actions can be expressed as:

$$Action=\{EdgeServer_1, EdgeServer_2, \ldots, EdgeServer_n, cloud\}$$

Where $EdgeServer_n$ indicates an n-th edge server, and cloud indicates a cloud server.

Reward:

As can be seen from the objective criteria for computation offloading, the shorter the latency consumed for completing the task in response to user task offloading requests, the better the effect is. Therefore, it concludes that when a user task is offloaded to an edge server in the current region, the latency consumed is much smaller than the latency consumed for offloading to an edge server in other regions, and is much smaller than the latency consumed for offloading to a cloud server. Similarly, the cost consumed for offloading to the edge server in other region is slightly greater than the cost consumed for offloading to the edge server in the current region, and is smaller than the cost consumed for offloading to the cloud server. Thus, different priorities are set to identify different levels of servers. For example, $$\begin{cases} \text{High priority in a case of a local server} \\ \text{Medium priority in a case of other regional servers} \\ \text{Low priority in a case of a cloud server} \end{cases}$$

different yields may be acquired according to different priorities; high priority is expected to generate greater yields while medium priority yields relatively little yields. A cloud server is expected to acquire negative yields due to the high latency problem caused by its long distance. The computation formula for the reward is as follows:

$$reward = \begin{cases} \lambda * 1, \text{ high priority} \\ \lambda * 0.5, \text{ medium priority} \\ \lambda * -1, \text{ low priority} \end{cases}$$

where $\lambda$ indicates an attenuation factor to prevent network convergence from getting too fast.

The following describes a Deep Q-learning based adaptive learning process of computation offloading.

***********************************************************
Algorithm 2. DQN-based computation offloading algorithm
Input: predictive neural network, target neural network, experience pool
Output: network performance indicator
(1) Initialize an experience pool to acquire parameters of a neural network
Repeat:
(2) Determine a current state from information of an edge server and task requests
(3) Select action (offloading node) actions based on the current state using a predictive neural network or $\varepsilon_-$ greedy strategy
(4) The user offloads to an edge server [action] or cloud server
(5) Acquire a new state and calculate action rewards
(6) Store quaternion (current state, action, reward, new state) into an experience pool
(7) Randomly take a sample from the experience pool as training data of a predictive neural network
(8) Calculate a loss function based on the predictive neural network and target neural network
(9) Update parameters of the predictive neural network by using the loss function -continued (10) Replace parameters of the predictive neural network with parameters of a target neural network after a certain number of training and exploration
(11) Record the network performance indicator of this time
End condition: a termination state or training number is reached
Return: network performance indicator
***********************************************************

Figure 6A:
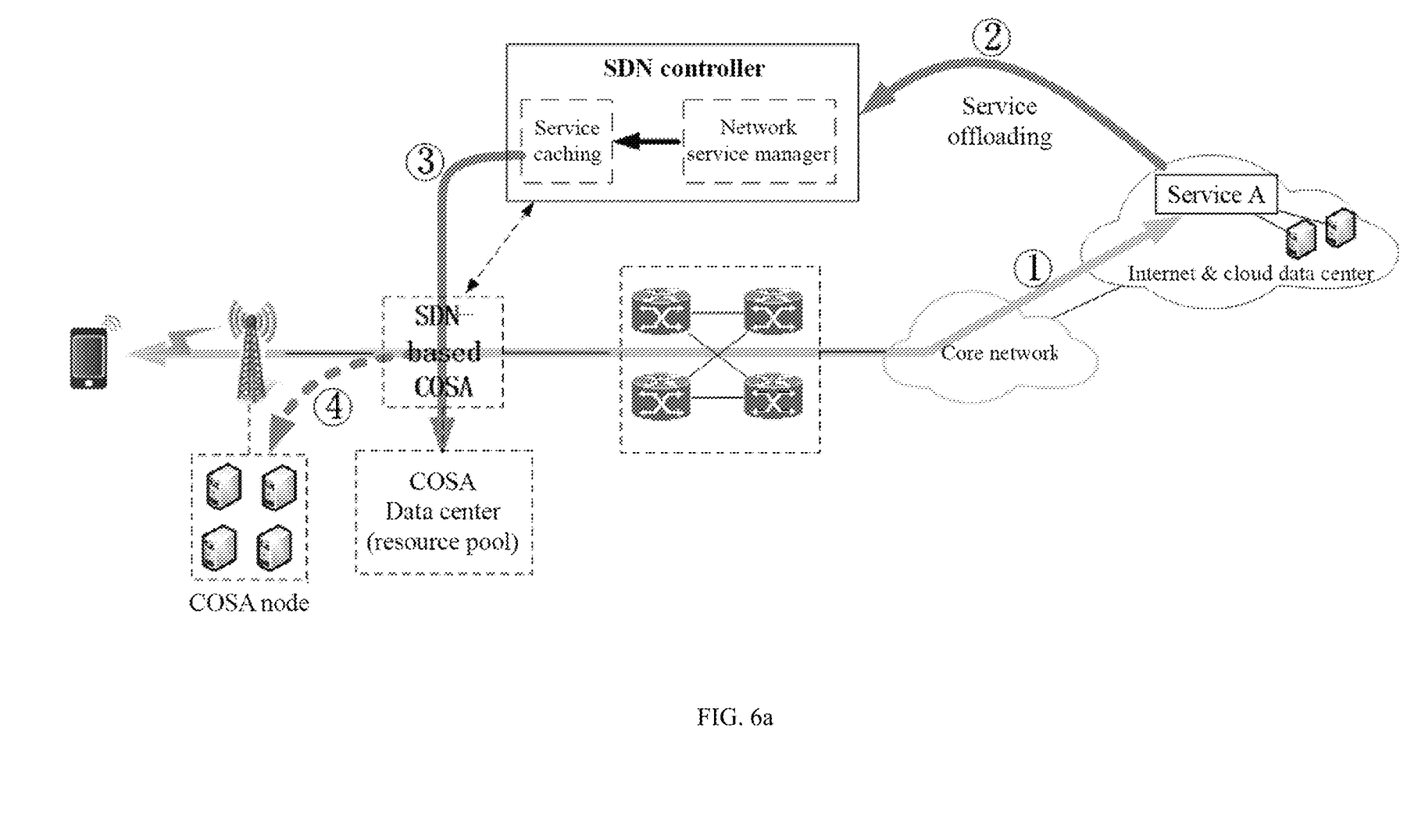
FIGS. 6a-b are flow diagrams of SDN based resource allocation and task offloading according to an embodiment of the present application.
Figure 6B:
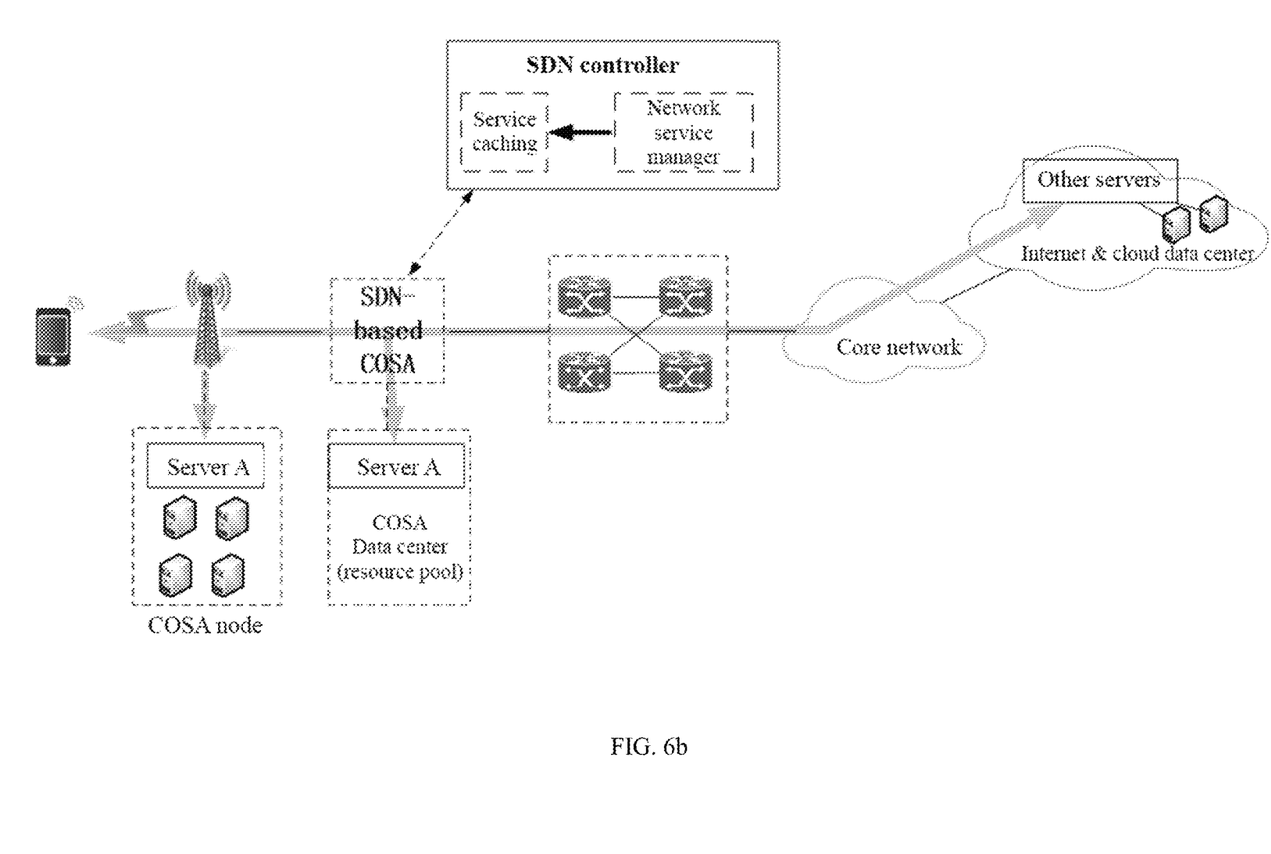

More specifically, the working mechanism of SDN in an MEC architecture is as follows:

First, Internet service providers proactively offload services associated with themselves to MEC nodes. FIG. 6 shows a flowchart of SDN based resource allocation and task offloading, where it is assumed that a mobile user is accessing an Internet based game front-end server over a regular data path. The gaming service provider uses the MEC node by registration, so as to proactively offload its services and caching and storing them in an appropriate SNodes. Further, the SNode pushes services to a terminal user by replicating them to a CNode. Meanwhile, the CNode collects channel information CSI of mobile users in a coverage area within a fixed time interval and reports the CSI to the SNode.

After the computing services are offloaded, a mobile user who wants to access the game server may send his/her request to the SNode. The SNode first runs a physical layer/MAC layer allocation algorithm according to the channel quality of the user. Next, in response to the MAC protocol and the access requirement distributed by the terminal user, the SNode performs offloading for the user using the optimal CNode, or offloads the user task to central cloud if there is no appropriate CNode. In this way, the relevant traffic is successfully offloaded from the network core and the Internet, thereby significantly alleviating the overload of traffic.

In summary, the present application provides a software defined fine-grained MEC architecture, which can perform fine-grained control and cooperative management on network resources and computing resources. In addition, a two-stage resource allocation strategy based on deep reinforcement learning Q-learning is designed. A large number of simulation experiments prove that the architecture can provide more effective computation offloading and service enhancement.

The present application may be a system, a method and/or a computer program product. The computer program product may include a computer-readable storage medium having computer-readable program instructions loaded thereon for causing a processor to implement various aspects of the present application.

The computer-readable storage medium may be a tangible device that holds and stores the instructions for use by an instruction execution device. The computer-readable storage medium may include, but is not limited to, for example, an electronic storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device such as punch card or in-groove raised structure having instructions stored thereon, and any suitable combination of the foregoing. The computer-readable storage medium as used herein is not to be interpreted as a transitory signal per se, such as a radio wave or other freely propagating electromagnetic wave, an electromagnetic wave propagating through a waveguide or other transmission medium (e.g., optical pulses through a fiber optic cable), or an electrical signal transmitted through an electrical wire.

The computer-readable program instructions described herein may be downloaded from a computer-readable storage medium to computing/processing devices, or to an external computer or external storage device via a network, such as the Internet, a local area network, a wide area network and/or a wireless network. The network may include copper transmission cables, optical fiber transmission, wireless transmission, routers, firewalls, switches, gateway computers and/or edge servers. The network adapter card or network interface in each computing/processing device receives a computer-readable program instruction from the network and forwards the computer-readable program instruction for storage in a computer-readable storage medium in each computing/processing device.

Computer program instructions for executing operations of the present application may be assembler instructions, instruction set architecture (ISA) instructions, machine instructions, machine-related instructions, microcode, firmware instructions, state setting data, or source or object code in any combination of one or more programming languages including an object-oriented programming language such as Smalltalk, C++ and Python, and a conventional procedural programming language such as the "C" language or similar programming languages. The computer-readable program instructions may execute entirely on the user's computer, partly on the user's computer, as a stand-alone software package, partly on the user's computer and partly on a remote computer or entirely on the remote computer or server. In the scenario involving a remote computer, the remote computer may be connected to the user's computer through any type of network, including a local area network (LAN) or a wide area network (WAN), or the connection may be made to an external computer (for example, through the Internet using an Internet service provider). In some embodiments, aspects of the present application are implemented by personalizing an electronic circuit, such as a programmable logic circuit, a field programmable gate array (FPGA) or a programmable logic array (PLA), with state information of computer-readable program instructions, the electronic circuit being capable of executing the computer-readable program instructions.

Aspects of the present application are described herein with reference to a flowchart and/or block diagrams of methods, apparatus (systems) and computer program products according to embodiments of the present application. It should be understood that each block of the flowchart and/or block diagrams, and combinations of blocks in the flowchart and/or block diagrams, can be implemented by computer-readable program instructions.

These computer-readable program instructions can be provided to the processor of a general-purpose computer, a special-purpose computer, or other programmable data processing apparatus, thereby producing a machine that causes these instructions, when executed by the processor of the computer or other programmable data processing apparatus, to produce an apparatus that implements the functions/motions specified in one or more blocks of the flowchart and/or block diagrams. These computer-readable program instructions may also be stored in a computer-readable storage medium, wherein these instructions can direct a computer, a programmable data processing apparatus and/or other devices to function in a particular manner, such that the computer-readable medium storing the instructions comprises an article of manufacture including instructions which implement the functions/motions specified in the one or more blocks of the flowchart and/or block diagrams.

The computer-readable program instructions may also be loaded onto a computer, other programmable data processing apparatus or other devices to cause a series of operational steps to be executed on the computer, other programmable apparatus or other devices to produce a computer implemented process such that the instructions executed on the computer, other programmable data processing apparatus or other devices implement the functions/motions specified in the one or more blocks of the flowchart and/or block diagrams.

The flowchart and block diagrams in the figures illustrate the architecture, functions, and operation of possible implementations of the system, method and computer program product according to various embodiments of the present application. In this regard, each block in the flowchart or block diagrams may represent a portion of a module, segment or instructions which comprises one or more executable instructions for implementing the specified logical functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functions involved. It should also be noted that each block in the block diagrams and/or the flowchart, and combinations of blocks in the block diagrams and/or the flowchart, can be implemented by special-purpose hardware-based systems that perform the specified functions or motions, or by combinations of special-purpose hardware and computer instructions. It is well known to those skilled in the art that the implementations by hardware and software and a combination of software and hardware are equivalent.

While various embodiments of the present application have been described above, the descriptions are exemplary, not exhaustive, and not limited to the disclosed embodiments. Many modifications and variations will be apparent to those of ordinary skill in the art without departing from the scope and spirit of the described embodiments. The terms used herein are chosen in order to best explain the principles of the embodiments, the practical application or technical improvements in the market, or to enable others of ordinary skill in the art to understand the embodiments disclosed herein. The scope of the present application is defined by the appended claims.

What is claimed is:

1. A cloud-network integration oriented multi-access edge computing architecture, wherein an access network side of the architecture is provided with a plurality of edge computing nodes, a physical channel of the access network side is split into a plurality of subchannels with each of the plurality of the subchannels supporting a media access control (MAC) access mode, and a software defined network controller is arranged in the architecture and is configured to allocate resources of the plurality of the subchannels at a physical layer and protocols at a MAC layer and control offloading of a terminal user at the edge computing nodes or a cloud center;

wherein the access network side is provided with various types of edge computing nodes including common nodes, regional nodes, super nodes and certificate authority nodes, wherein the common nodes are distributed in the access network and are configured to provide computation offloading services for the terminal user and provide storage resources for service caching of remote Internet or cloud services; the regional nodes are positioned at regional edge computing nodes in the access network and are configured to discover the resources, and manage or monitor a state of common nodes in a region; the super nodes are positioned in a data center between the access network and a convergence network, and each of the super nodes is configured to manage common nodes and regional nodes which are distributed thereto by the software defined network controller; and the certificate authority nodes are positioned in the data center and are configured to generate and manage certificates of the terminal user.

2. The cloud-network integration oriented multi-access edge computing architecture according to claim 1, wherein in response to a request of the terminal user for transmission or computing, the software defined network controller runs a resource allocation strategy by allocating the resources according to channel quality, transmission requirements, or computing requirements of the terminal user, and feeding back an allocation result in a Frequency-Confirm To Send (F-CTS), and after waiting for a Point Coordination Function (PCF) interframe space, the terminal user accesses the allocated resources according to notification.

3. The cloud-network integration oriented multi-access edge computing architecture according to claim 1, wherein for a given user task $ClientTask_i$ and channel quality $CSI_i$, optimizing network utility and computing utility is taken as a resource allocation objective, which is expressed as:

$$\text{Utility} = \max \Phi(ServerSource, ClientTask, MACProtocol, CSI) =$$

$$\max \sum_{i=1}^{m} \Phi_{ServerSource_j}^{ClientTask_i} \Phi_{CSI_i}^{MAC\ Protocol_i}$$

wherein the user task $ClientTask_i$, ($i \in \{1, 2, \ldots, m\}$) indicates a task request submitted by a user i, $ServerSource_j$, ($j \in \{1, 2, \ldots, n\}$) indicates a quantity of resource possessed by a service node j, a MAC protocol is represented as MACProtocol={TDMA, CSMA}, and the channel quality CSI is represented as CSI={$CSI_{c1}$, $CSI_{c2}$, ..., $CSI_{cm}$}, TDMA indicates Time Division Multiple Access, CSMA indicates Carrier Sense Multiple Access.

4. The cloud-network integration oriented multi-access edge computing architecture according to claim 3, wherein the following constraint conditions are met when solving the resource allocation objective:
the user task is smaller than a service node resource; and relationship between the MAC protocol selected by the user and the channel quality CSI is: MAC=$\lambda$*CSI, wherein $\lambda$ indicates a probability of selecting a certain MAC protocol.

5. The cloud-network integration oriented multi-access edge computing architecture according to claim 1, wherein a super node (SNode) allocates, according to a channel quality $CSI_{(1, 2, \ldots, m)}$ of the terminal user, a MAC protocol to the terminal user by using reinforcement Learning Q-Learning, wherein State indicates the channel quality of the terminal user, and an overall system state is expressed as: State={$Subch_1$, $Subch_2$, ..., $Subch_n$, $MAC_i$}; Action is expressed as a MAC protocol selected by a user, and an Action set is expressed as {$MAC_1$, $MAC_2$, ..., $MAC_n$}; and Reward is determined by an environment information state before and after an action is executed;
Wherein subch indicates a channel resource, $MAC_i$ indicates a subchannel MAC protocol allocated by an i-th user, m indicates a number of terminal users, and n indicates a number of edge computing nodes.

6. The cloud-network integration oriented multi-access edge computing architecture according to claim 5, wherein the Reward is calculated according to the following formula:

$$reward = \begin{cases} 0, & IncreaseRatio > 0 \wedge MAC \text{ no change} \\ \lambda * IncreaseRatio, & others \end{cases}$$

wherein $\lambda$ indicates an attenuation factor.

7. The cloud-network integration oriented multi-access edge computing architecture according to claim 5, wherein the super node (SNode), by adopting the reinforcement Learning Q-Learning, performs strategy learning of computation offloading for the terminal user, wherein the State indicates information of an edge server and task information submitted by the user, and the overall system state is expressed as:

State={$EdgeServerSource_1$, $EdgeServerSource_2$, ..., $EdgeServerSource_n$, $Task_u$}, Action indicates the user selecting to offload a server, and the Action set is represented as: Action={$EdgeServer_1$, $EdgeServer_2$, ..., $EdgeServer_n$, cloud}; and the Reward indicates a latency required for completing a task in response to a user task offloading request;
Wherein $EdgeServerSource_n$ indicates resources possessed by an n-th edge server, $Task_u$ indicates task request information of a u-th user, $EdgeServer_n$ indicates an n-th edge server, and cloud indicates a cloud server.

8. The cloud-network integration oriented multi-access edge computing architecture according to claim 7, wherein the Reward is calculated according to the following formula:

$$reward = \begin{cases} \lambda * 1, & \text{high priority} \\ \lambda * 0.5, & \text{medium priority} \\ \lambda * -1, & \text{low priority} \end{cases}$$

wherein $\lambda$ indicates an attenuation factor, and is given a high priority in a case of offloading to a local server, given a medium priority in a case of offloading to other regional servers, and given a low priority in a case of offloading to a cloud server.

9. A non-transitory computer-readable storage medium having a computer program stored thereon, wherein the program, when executed by a processor, implements a cloud-network integration oriented multi-access edge computing architecture according to claim 1.

* * * * *